United States Patent [19]
Goodrich

[11] Patent Number: 5,687,962
[45] Date of Patent: Nov. 18, 1997

[54] BEARING LOCKING MECHANISM, WORK SUPPORT

[76] Inventor: Lloyd D. Goodrich, 28111 Shock, St. Clair Shores, Mich. 48081

[21] Appl. No.: 474,361

[22] Filed: Jun. 7, 1995

[51] Int. Cl.⁶ ............................................................ B23Q 3/00
[52] U.S. Cl. .......................... 269/317; 269/310; 269/329; 403/321
[58] Field of Search .............................. 269/20, 47, 315, 269/317, 316, 217, 310, 329, 900, 303, 305, 309; 92/15; 403/321, 328

[56] References Cited

U.S. PATENT DOCUMENTS

| | | | |
|---|---|---|---|
| 2,942,903 | 6/1960 | Giladett | 403/321 |
| 3,043,614 | 7/1962 | Eichmann | 403/321 |
| 3,689,060 | 9/1972 | Hensley, Jr. | 269/217 |
| 4,445,675 | 5/1984 | Kitaura | 269/20 |
| 4,932,642 | 6/1990 | Salenbien et al. | 269/309 |
| 5,056,418 | 10/1991 | Granger et al. | 92/15 |
| 5,409,322 | 4/1995 | Horekawa et al. | 403/328 |

*Primary Examiner*—Timothy V. Eley
*Assistant Examiner*—Lee Wilson
*Attorney, Agent, or Firm*—M Michael Hamburg

[57] ABSTRACT

A work support incorporating an improved bearing locking mechanism comprises a body having a first and second end and a body bore defined by a body inner wall; a pin defining a pin ramp and slidably positioned within the body bore to receive a work piece load; a plurality of roller bearings circumferentially spaced about the body bore; a nose cap closing the first end, and a cage assembly to engage roller bearings, close the second end and form a barrier to receive fluid back pressure. Introduction of fluid back pressure and work piece load rotates the roller bearings toward the pin ramp and urges the pin in an opposing direction, locking the roller bearings, pin ramp and body inner wall. The work piece load and fluid back pressure are both introduced and then both removed to respectively cause locking and unlocking to occur. A method of using a work support comprises the steps of introducing a work piece load and fluid back pressure, and continuing the locking relationship until both work piece load and fluid back pressure are removed.

29 Claims, 3 Drawing Sheets

BEARING LOCKING MECHANISM, WORK SUPPORT

BACKGROUND OF THE INVENTION

This invention relates to an improved bearing lock mechanism, useful in a work support, which uses roller bearings to create a locking mechanism which will retain a pin in desired position to hold work piece loads in place.

More specifically, this invention describes a new and improved bearing lock mechanism, a work support incorporating such a mechanism, and a method of using the same, which involves a plurality of roller bearings slidably interacting with a ramped pin and an inner wall of a body to lock the pin with the assistance of relatively low air or other fluid back pressure. In addition, a further improved aspect of this invention involves the maintenance of the locking relationship between the roller bearings, the ramped pin and the inner wall upon partial or complete termination of air or other fluid back pressure, until the work piece load is also removed from the pin.

A variety of devices and designs have been used or proposed for use as work supports, or work support locking mechanisms, to hold work pieces in a stable position during machining or other manufacturing operations on the work piece. As an example, fluid back pressure or air pressure may be used to support a pin which slidably moves inside an essentially cylindrical body to hold a work piece. Additionally, air pressure or other fluid pressure may be applied in a transverse direction to a longitudinal travel path of a pin along a body axis, to cause a tubular collet to contact the pin. The resulting friction between the collet and the pin may be used along with air or other fluid back pressure applied in a longitudinal direction to help lock the pin in place while the pin is under a work piece load.

In order to maintain the integrity of such operations, and avoid damage to work pieces, any locking mechanism in, for example, a work support used to maintain the work piece position should not readily slip, break down or excessively wear under significant loads typical to usage of such supports. Many existing work supports, and locking mechanisms utilized, suffer from one or more of these problems. Sometimes a problem manifests itself through slippage of the work support components, causing loss of stable positioning of the work piece and potential injury to workers. Other times there may even be unexpected physical failure of the work support, and resulting damage to the work piece or interruption of the manufacturing operations. This can occur various ways, such as cracking or other loss of body wall integrity, or damage to internal work support components.

Work supports and similar devices are, therefore, at times required to operate under conditions of relatively high air or other fluid pressure, in an attempt to compensate for inadequate or unreliable locking mechanisms. Such mechanisms may require relatively high pressure levels to remain locked, or may utilize such pressure levels to try to avoid slippage or failure of the work support. Work supports with locking mechanisms using transverse fluid pressure are an example. With these types of devices relatively high transverse pressures are typically required to stop longitudinal pin slippage from a work piece load. A higher transverse pressure is believed to be needed to lock a pin subjected to a given longitudinal load than is needed as back pressure to lock the pin. This relatively high transverse pressure condition may result in a physical failure of the work support body, or wearing or other damage to the work support components that effectively shortens the useful life of the work support and locking mechanism. It also leads to unduly complicated work support and locking mechanism designs, or the need to over design components for safety because of the unreliability of transverse fluid pressure alone to act as a locking technique. Fluid back pressure is often added to these designs as a second part of the locking technique. This adds a second relatively high pressure fluid source in the work support, with consequent risk of damage and wearing of components. This approach, may still, however, encounter premature, unpredictable failure or slippage of the work support and locking mechanism, and also risks loss of locking condition if fluid back pressure is interrupted.

Further undesirable characteristics may arise in work supports and locking mechanisms which use relatively high air or other fluid pressure as part of the locking mechanism. An example is the possibility of work support components being placed under such extreme pressure and/or friction that a seizure of the components occurs. The work support locking mechanism then ceases to function when the fluid pressure is removed. Components may then become difficult or virtually impossible to unlock without destruction of the work support, possible manufacturing interruption, and/or damage to work pieces. It is an important consideration to the manufacture and use of a work support that the locking mechanism operate to lock and unlock at intended times.

Work supports and related locking mechanisms are also used in a variety of industrial locations. In some locations obtaining a source of relatively high fluid pressure for use at the desired plant site is not possible or is at best, inconvenient. Most facilities, however, have ready access to a source of relatively low air pressure. This makes the use of a low pressure work support and locking mechanism very desirable.

A further problem that may arise with work supports and locking mechanisms is that any interruption or reduction in air or other fluid pressure transmitted in a longitudinal direction to the pin may cause a loss of the locking relationship between the pin and the work support body. A work support which requires relatively high pressure conditions to lock will be particularly subject to risk of locking failure when any interruption or momentary reduction of air or other fluid pressure occurs. This may be a problem, for example, when pressure lines burst, or electric power is temporarily lost. In effect this means that friction, or other similar forces used in conjunction with air or other fluid pressure, are typically not sufficient to maintain the work support locking mechanism in a locked condition once the air/fluid pressure is reduced or terminated. A work support's usual purpose is to remain in a locked condition, holding the work piece in the desired position, until an operator is ready to remove the work piece load from the work support at the conclusion of machining or similar work piece manufacturing operations. Any unlocking of the work support upon sudden, unexpected, or inadvertent loss of air pressure or other fluid pressure, regardless of cause, is potentially detrimental to the work piece integrity, the continuity of manufacturing, and the safety of the operator. It is simply preferred that once a work support's locking mechanism is placed in a locked condition, that support and locking mechanism have the capability and a high degree of reliability that each will remain in a locked condition until the work piece load is removed-even if any air/fluid pressure utilized is completely terminated.

Prior to the present invention, it is believed there has not been a reliable work support locking mechanism of a simple design, that operates on the basis of friction, relatively high air or fluid pressure (applied in either a transverse or longitudinal direction), or other approaches, that also avoids seizure of components, unpredictable physical failure, and wearing of components after infrequent usage.

In addition, it has been difficult to achieve desired reliability for such work supports and locking mechanisms where the work support or locking mechanism is not capable of maintaining its locking function (without seizure) upon partial or total interruption of air/fluid pressure.

Thus it can be seen that a need exists for a work support, and more particularly, a work support locking mechanism, which will provide a reliable locking and unlocking operation, avoid the problems described above, including the necessity of operating such work supports at relatively high air and other fluid pressures, and the potential loss of locking upon loss of air/fluid pressure, and yet prove efficient and cost effective.

It is, therefore, an object of the present invention to provide an improved locking mechanism and corresponding work support, through the use of a pin, body and a plurality of roller bearings, whereby a locking relationship may be reliably created and then released, with substantially reduced risk of seizure or unpredictable failure, by selective application and removal of both relatively low fluid back pressure and a work piece load directed at opposite longitudinal ends of the pin.

It another object of the present invention to substantially reduce the air or other fluid pressure necessary to lock a work support, and maintain that locked condition, without significantly affecting the maximum load with which the support may be used.

It is a further object of the present invention to virtually eliminate slippage of the locking mechanism and breakdown of a work support body, and substantially reduce wear of work support components, thereby extending the operational life of the locking mechanism and work support.

Yet another object is to substantially avoid seizure of locking mechanism and work support components while the pin is in a locking condition, such that the locking mechanism and work support may be unlocked at the desired time.

It is yet another object of the present invention to provide an improved locking mechanism, work support and method of using that work support whereby a locking condition of the pin and body may be maintained even after reduction or loss of air/fluid pressure, until the work piece load is also removed.

SUMMARY OF THE INVENTION

The present invention presents a solution to the problems described above, by providing a locking mechanism, work support and method of using the same, whereby the work support locking mechanism and reliability are improved, and the incidence of wearing and pressure induced failure or seizing of the locking mechanism and work support components during use is substantially reduced, particularly within ranges of normal operating conditions for such locking mechanisms and work supports. In addition, the present invention permits advantageous use of a locking mechanism and work support at relatively low fluid back pressure levels to create a locking condition; and allows that locking condition to continue upon partial or total loss of fluid back pressure until the work piece load is also removed.

The objects, benefits and advantages of the present invention accordingly are achieved by this improved locking mechanism, work support, and method of using the same, whereby a locking mechanism, and corresponding work support are provided that work with a relatively low fluid back pressure level, the life expectancy of a locking mechanism and work support are enhanced, the occurrence of locking and unlocking actions is made more reliable and predictable, and maintenance of a locking mechanism and work support in a locked position is made possible whether or not fluid back pressure is interrupted.

A work support incorporating an improved bearing locking mechanism comprises a body having a first and second end and a body bore defined by a body inner wall; a pin defining a pin ramp and slidably positioned within the body bore to receive a work piece load; a plurality of roller bearings circumferentially spaced about the body bore; a nose cap closing the first end, and a cage assembly to engage roller bearings, close the second end and form a barrier to receive fluid back pressure. Introduction of fluid back pressure and work piece load rotates the roller bearings toward the pin ramp and urges the pin in an opposing direction, locking the roller bearings, pin ramp and body inner wall. The work piece load and fluid back pressure are both introduced and then both removed to respectively cause locking and unlocking to occur. A method of using a work support comprises the steps of introducing a work piece load and fluid back pressure, and continuing the locking relationship until both work piece load and fluid back pressure are removed.

BRIEF DESCRIPTION OF THE DRAWINGS

Other objects, features and advantages of the present invention will become apparent after reference to the following detailed description and drawings, wherein.

DETAILED DESCRIPTION OF THE PREFERRED EMBODIMENT

Figure 1:
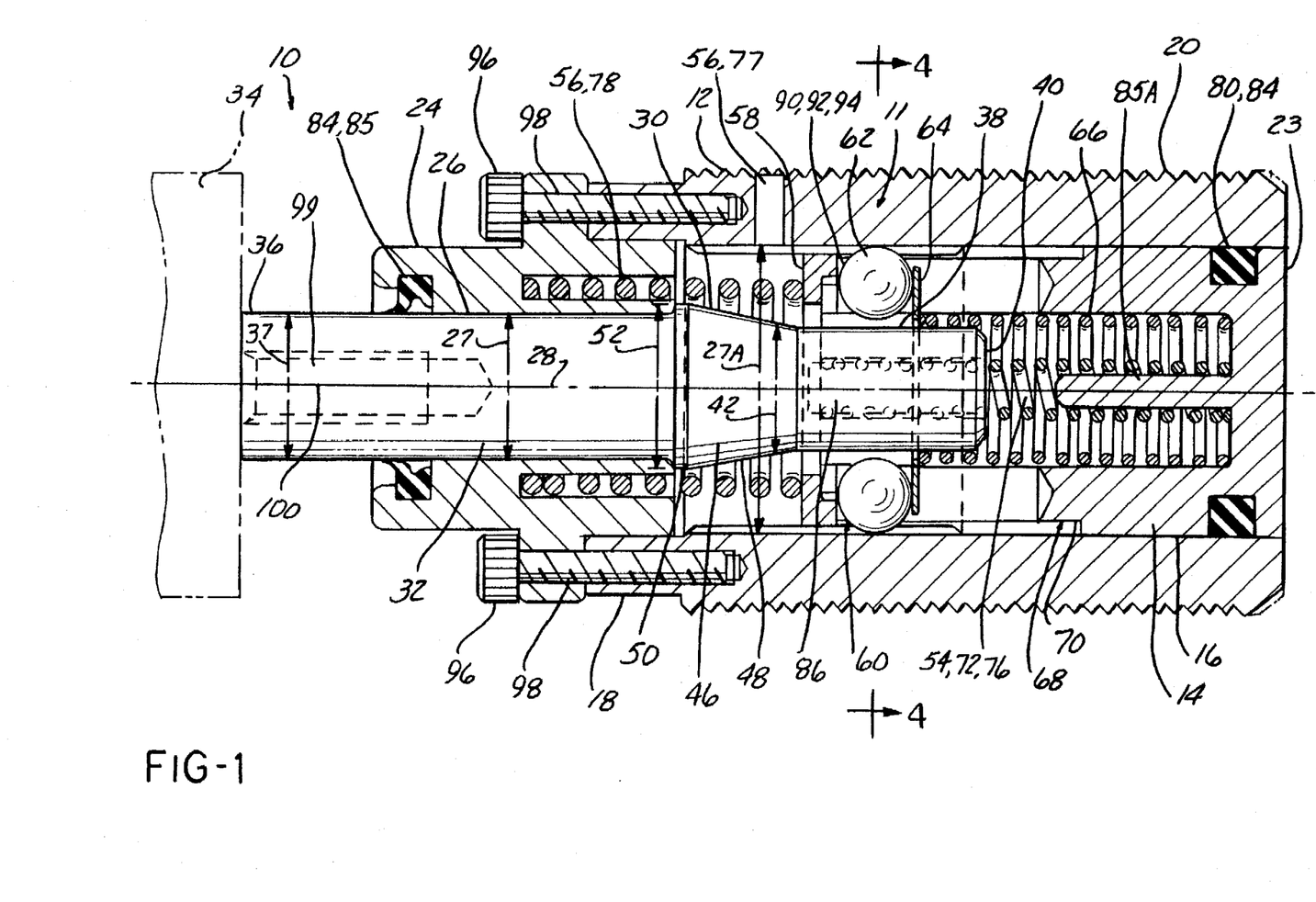
FIG. 1 is a front cross sectional view of a locking mechanism, and corresponding work support in accordance with the present invention, showing an embodiment having spherical roller bearings.
Figure 6:
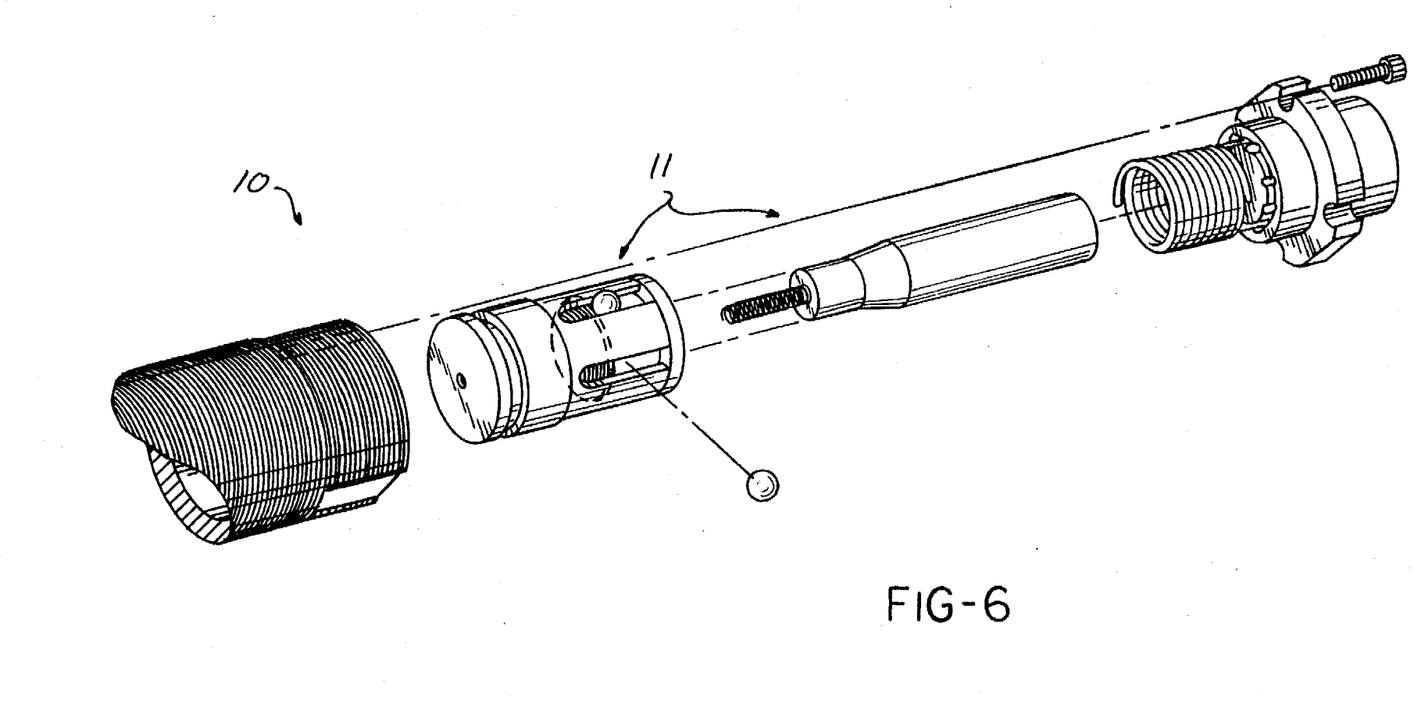
FIG. 6 is an exploded perspective view of a locking mechanism and work support in accordance with the present invention, showing the positioning of a body, cage assembly, pin assembly and nose cap prior to assembly.

Referring now in detail to the drawings, a work support in accordance with the present invention is illustrated in FIG. 1 and designated generally as 10. In another aspect of the present invention, an improved bearing locking mechanism 11 is also illustrated in FIG. 1, and designated generally as 11. The relative positions of various components of work support 10 and locking mechanism 11 in one preferred embodiment are illustrated in FIG. 6 in exploded perspective view for further ease of understanding.

In one preferred embodiment of the present invention, the work support 10 comprises a body 12, preferably of cylindrical shape, containing a body bore 14 with a circumference defined by an inner wall of the body 16, which body bore extends from a first end of the body 18 toward a second end of the body 20. The body 12 is partially enclosed by a barrier 23 (further described below) located toward the second end of the body 20. In addition, the body 12 also is connected to a nose cap 24 by any conventional means, partially closing the first end of the body 18 to define a nose cap opening 26 with a nose cap opening diameter 27 smaller than a body bore diameter 27A wherein the nose cap opening 26 and the body bore 14 are each formed about a longitudinal axis of the body 28.

The work support 10 illustrated in FIG. 1 further comprises a pin assembly 30, which itself comprises the following elements. A cylindrical pin 32 for receiving a work piece load 34, is provided for slidably fitting into the body bore 14. The cylindrical pin 32 has a first portion of the pin 36 with a first portion diameter 37 approximating the nose cap opening diameter 27, a second portion of the pin 38 defined by an opposing end of the pin 40 having a second portion diameter 42 less than a first portion diameter 37. In addition, the pin 32 has a middle portion of the pin 46 generally defining a pin ramp 48 connecting the first and second portions of the pin 36, 38, which pin ramp 48 has a terminal end of the pin ramp 50 formed toward the first portion of the pin 36 with a terminal end diameter 52 larger than the nose cap opening 26.

The pin assembly 30 further comprises a pin return device 54, positioned between the second portion of the pin 38 and the second end of the body 20, for proper longitudinal pin positioning upon resetting of the pin 32. The pin assembly 30 additionally comprises a reset system 56, positioned between the nose cap 24 and a cage cap 58, to reset a bearing assembly 60 upon removal of the work piece load 34 on the pin 32 and release of fluid back pressure.

The work support 10 of FIG. 1 further comprises a bearing assembly 60 positioned in the body bore 14, which itself comprises the following: a plurality of roller bearings 62 are spaced circumferentially about a cross sectional plane of the body bore 15 at location 4—4 of FIG. 1, so as to contact the pin ramp 48 and the inner wall of the body 16 upon rotation of the bearings 62 toward the first end of the body 18.

The bearing assembly 60 further comprises a shim plate 64 positioned between the bearings 62 and the second end of the body 20.

In addition, the bearing assembly 60 additionally comprises a ball retention spring 66 positioned between the shim plate 64 and the second end of the body 20, to maintain a positive contact between the shim plate 64 and the bearings 62.

The bearing assembly 60 additionally comprises a cage assembly 68 for retaining bearings 62 in position for longitudinal movement. Referring once again to FIG. 1, cage assembly 68 comprises a cage 70 engaging the bearings 62 from the second end of the body 20, which cage 70 includes a barrier 23 that encloses the second end of the body 20 with the work support 10 in an unlocked condition, as the cage 70 is then positioned toward the second end of the body 20. The barrier 23 may receive fluid back pressure from an external source while the body 12 is held in a fixture or other receptacle. The fluid back pressure moves the cage 70 and helps lock the work support 10. Cage assembly 68 further comprises a cage cap 58 attached to the cage 70 by any conventional means between the bearings 62 and the first end of the body 18 so as to capture the bearings 62 in the cage 70 and between said cage cap 58 and said shim plate 64. As stated, in one preferred embodiment, the barrier 23 may be formed by a portion of the cage 70, although the barrier 23 may also be formed as an integral, movable portion of the body 20. The shim plate 64 directly or indirectly communicates with the barrier 23.

Figure 3:
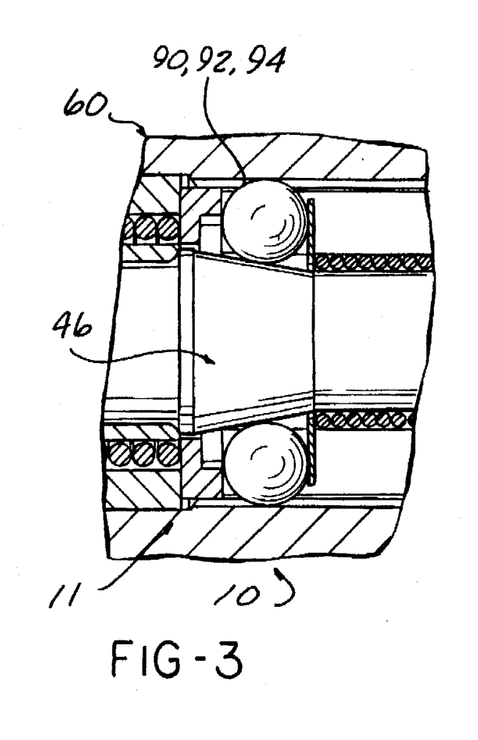
FIG. 3 is a partial front cross sectional view of a locking mechanism and work support in accordance with the present invention, showing the roller bearings in a locked position.
Figure 4:
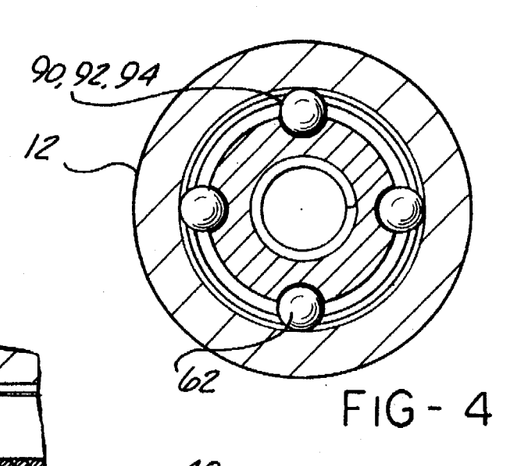
FIG. 4 is an end cross sectional view of a locking mechanism and work support in accordance with the present invention, taken at position 4—4 of FIG. 1, showing spherical roller bearings in relation to a shim plate, body and cage.

The relative position of certain aspects of the bearing assembly 60, the pin ramp 48 and the inner wall of the body 16 are shown in FIG. 3 as a front cross-sectional view through the longitudinal axis of the body 12 with the work support 10 in a locked position. The relative position of the body 12, shim plate 64 and bearings 62 are also shown in FIG. 4 as an end cross-sectional view taken at position 4—4 of FIG. 1.

The pin return device 54 may alternatively comprise any material having elastic memory 72, a pin return spring 76, or any other device capable of resetting the pin assembly 30.

The reset system 56, used for resetting the bearing assembly 60, upon removal of work piece load 34 and release of fluid back pressure, may alternatively comprise a side port 77 through the body 12 as shown in FIG. 1 for introduction of pressurized fluid, or a reset spring 78. Although a port 77 and a reset spring 78 are both shown on FIG. 1, preferably only one of these alternatives would be used in a given work support 10.

Work support 10 may further comprise a cage seal 80 communicating with the cage 70 and the body 12 in order to provide an effective seal against introduction of external contaminants into the body bore 14 that may interfere with proper operation and movement of the bearing assembly 60 and the pin assembly 30. The cage seal 80 may comprise any type of sealing device which will provide an effective sealing relationship between the cage 70 and the body 12. One example of a cage seal 80 comprises an o-ring seal 84.

Work support 10 may further comprise a lip seal 85 communicating with the nose cap 24 and the pin 32. This lip seal 82 has a similar function to that of a cage seal 80. The lip seal 85 may comprise any sealing device capable of providing an effective sealing relationship between the nose cap 24 and the pin 32 to avoid introduction of external contaminants into the body bore 14. The lip seal 85 may in one embodiment comprise an o-ring seal 84.

Referring once again to FIG. 1, in an embodiment of work support 10 utilizing a pin return spring 76 as the type of pin return device 54, the second end of the body 20 may form a cylindrical extension 85A which extends into the body bore 14. In addition, in that embodiment, the pin 32 may contain a pin cavity 86 formed in the second portion of the pin 38. The cylindrical extension 85A and the pin cavity 86 each may then retain one end of the pin return device 54 (such as pin return spring 76) in desired radial position about the longitudinal body axis 28.

In one preferred embodiment of the present invention, the roller bearings 62 comprise spherical roller bearings 90, and the bearing assembly 60 preferably comprises at least four such bearings 90. This may be seen by referring to FIGS. 1 and 4. The roller bearings 62 may preferably comprise steel roller bearings 92 with a hardness of at least about 60 on a Rockwell hardness scale.

The roller bearings 62 may also alternatively comprise stainless steel roller bearings 94 with the hardness of at least about 60 on a Rockwell scale. In addition to steel and stainless steel roller bearings 92, 94 any other material having sufficient hardness to avoid deformation or wearing upon use in a work support 10 or locking mechanism 11 may be utilized as spherical roller bearings 90 or any alternative type of roller bearings 62 hereafter described for use with the present invention.

Figure 5:
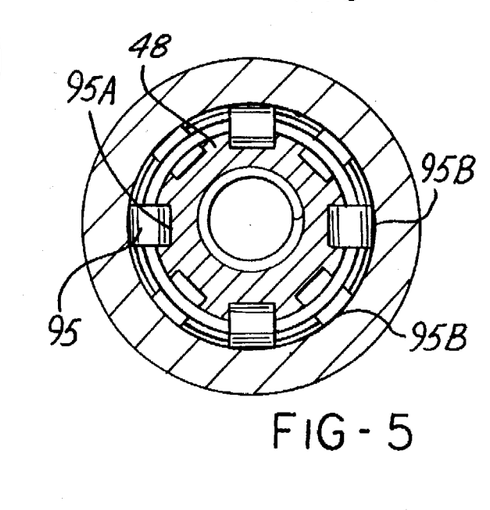
FIG. 5 is an end cross sectional view of a locking mechanism and work support, taken at position 4—4 of FIG. 1, showing an alternative embodiment having cylindrical roller bearings positioned in relation to channels in a pin ramp, a shim plate, body and cage.

In a further alternative embodiment, the roller bearings 62 comprise cylindrical roller bearings 95, which are movably positioned to interact with a plurality of corresponding pin ramp channels 95A formed in the pin ramp 48 and a plurality of corresponding body channels 95B formed in the inner wall of the body 16, each of which is illustrated in FIG. 5. The pin ramp channels 95A and body channels 95B cooperate with the cylindrical roller bearings 95 as the bearings 95 selectively move into and out of a locked condition. In the locked condition the bearings 95 are accepted by the corresponding channels 95A, 95B for each such bearing 95. In this embodiment, the bearing assembly will preferably comprise at least four cylindrical roller bearings 95.

Referring once again to FIG. 1, the nose cap 24 may be connected to the body 18 by any conventional desired technique. In a preferred embodiment, a plurality of nose cap retaining screws 96 are used in attaching the nose cap 24 to the first end of the body 18 through a plurality of aligned, tapped holes 98 formed through the nose cap 24 and continuing into the first end of the body 18.

In one preferred embodiment of the work support 10, the first portion of the pin 36 may contain a tapped hole 99 formed about the pin longitudinal axis 100. This is to provide ease of connection to the work piece load 34.

In one alternative preferred embodiment, the roller bearings 62, pin 32 and body 12 may be made of materials with approximately equal Rockwell hardness, although that is not required.

The operation of the work support 10 in a preferred embodiment described above will now be explained. The body 12 is to provide a body bore 14 within which the pin assembly 30 and the bearing assembly 60 are able to move. Upon placing a work piece load 34 on the first portion of the pin 36, the pin assembly 30 and in particular the cylindrical pin 32 are caused to move in a longitudinal direction toward the second end of the body 20.

By the application of fluid back pressure delivered against the barrier 23 through any fixture in which the body 12 is held, the cage 70 and cage cap 58 which engage the bearing assembly 60 are forced to move in a longitudinal direction toward the first end of the body 18. In this manner, the bearings 62 interact with the pin ramp 48 and the inner wall of the body 16 such that a locking condition is created so that the pin 32 is substantially prevented from moving in either longitudinal direction while the locking condition continues in effect. In certain conventional friction based work supports, fluid back pressure alone or in combination with transverse fluid pressure against a collet is used to retain a locking mechanism in a locked condition by creating a friction interface with a pin or simply putting pressure against the pin in a longitudinal direction.

In the present invention, once the fluid back pressure causes interaction of the bearings 62 with the pin ramp 48 and the inner wall of the body 16, as shown in FIG. 3, the locking condition is created and may be continued until both the fluid back pressure is removed and the work piece load 34 is removed. This is a significant improvement in work support 10 and locking mechanism 11 operation, as compared to conventional types of devices in which the removal of either the work piece load 34 or a high level of fluid back pressure typically causes the pin to move in one longitudinal direction or the other, whether or not that was desired. Without being bound to any theory, it is believed that this advantageous result is in part caused by the creation of forces between the bearings 62, the inner wall of the body 16 and the pin ramp 48 which attempt to rotate the roller bearings 62 rather than causing only a friction based interaction that may be more susceptible to slippage. These will be described for convenience as "radial forces". The radial forces described are believed to tend to push the roller bearings 62 against the inner wall of the body 16 and the pin ramp 48 as opposed to working toward overcoming friction and thus succeeding in involuntarily unlocking these components when one or both of the work piece load 34 or fluid back pressure against the barrier 23, for example, are removed. The radial forces believed to be created in operation of the present invention thus will tend to continue the locking relationship rather than defeat it.

If the work piece load 34 is removed, it is believed the radial forces tend to keep the pin in its present locked position. In the event that the fluid back pressure has been removed from the barrier 23 without removal of the work piece load 34, it is believed the same radial forces act to prevent the pin from slipping toward the second end of the body 20. In this manner, both the work piece load 34 and the fluid back pressure are to be removed before the locking condition may be released.

Upon the removal of both the work piece load 34 and the fluid back pressure, radial forces between the roller bearing 62, the inner wall of the body 16 and the pin ramp 48 are believed to be removed, and the work support 10 changes into an unlocked condition. This occurs by a combination of actions to reposition the bearing assembly 60 and the pin assembly 30 in respective positions approximating those in which those two assemblies originated prior to initiation of a locking condition. Once any radial forces are removed, the reset system 56 places longitudinal pressure on the cage cap 58 to move the cage assembly 68 and thus the bearing assembly 60 as well, toward the second end of the body 20. This movement is in part resisted and tempered by the ball retention spring 66 which places pressure in an opposing longitudinal direction against the shim plate 64, urging the bearing assembly 60 in the direction of the first end of the body 18. In addition, the pin assembly 30 is urged in the direction of the first end of the body 18 by means of the pin return device 54. Once the countering pressures of the reset system 56, the pin return device 54, and the ball retention spring 66 have completely dampened out movement of the various assemblies, the work support 10 is again in an unlocked condition, ready for reuse by initiation of fluid back pressure to the barrier 23 and addition of the work piece load 34.

Work support 10 and locking mechanism 11 exhibit the advantageous characteristics of moving into a locked condition at no more than about 80 psi fluid back pressure with the addition of the work piece load 34. This is significantly below the level of pressure required in other work supports and locking mechanisms, whereby pressure in the thousands of pounds per square inch have been dictated in generally unsuccessful attempts to make reliable work supports and locking mechanisms which will not unpredictably slip or unlock, and which also are not highly susceptible to physical failure or seizure due to the high pressures involved in trying to maintain the locked condition. Work support 10 and locking mechanism 11 do, however, provide the operational capability to lock and unlock when desired without significant risk of seizure of the components or unpredictable failure, up to at least about 6,000 psi fluid back pressure.

Throughout this document in any description of embodiments of the present invention, including also methods of using the same, the terms "fluid" and "fluid back pressure" are intended to include as "fluids" not only liquids but also gases, including but not limited to air.

Figure 2:
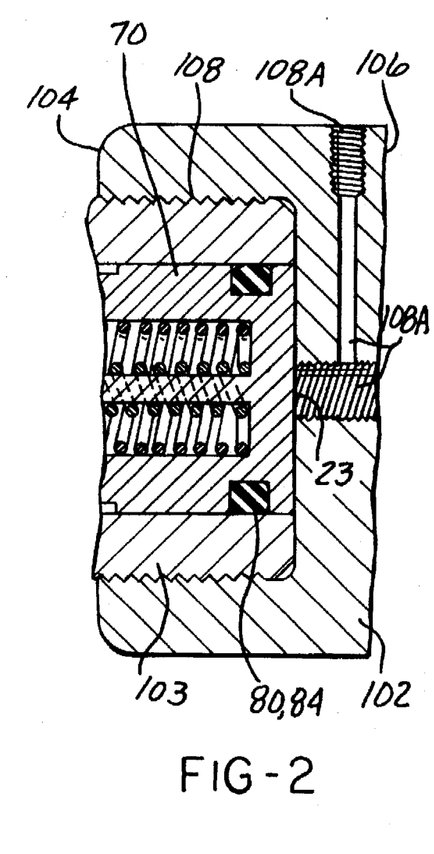
FIG. 2 is a partial front cross sectional view of a work support in accordance with the present invention, showing an alternative embodiment for porting of a body structure where no base is utilized.

Referring now to FIG. 2, an alternative embodiment of work support 10 will now be described, utilizing a cylindrical base 102 within which the body 12 may rest and utilizing an alternative method of porting fluid back pressure to work support 10.

As shown in FIG. 2, a work support 10 as generally described with reference to FIG. 1 is provided, wherein the body 12 comprises an externally threaded body 103, and further comprising a cylindrical base 102 with a base first end 104 and a base second end 106. The cylindrical base 102 contains an internally threaded bore 108 formed in the base first end 104 for receiving the threaded body 103. The embodiment of work support 10 as shown in FIG. 2 is further distinguished from the embodiment shown in FIG. 1 as the FIG. 2 embodiment defines at least one direct port 108A formed through the base second end 106 for the introduction of fluid back pressure. In this embodiment, the cage 70 may be formed to create a barrier 23 as shown in FIG. 2 in order to receive fluid back pressure against such barrier 23 which also acts as an external surface of the cage 70. The base 102 may form threaded openings in its outer surface, allowing it to be positioned and held in a fixture for ease of use and to enable delivery of fluid back pressure.

Embodiments of work support 10 and locking mechanism 11 utilizing a base 102 as shown in FIG. 2, are otherwise substantially identical to any embodiment described with reference to FIG. 1. Any components, configuration or method of operation described with reference to FIGS. 1, 3, 4 or 5 may also be applicable to an embodiment described with reference to FIG. 2, with the exception of the specific unique characteristics referenced in FIG. 2.

In one preferred embodiment, a method of using a work support 10 in accordance with the present invention will next be described, wherein the work support 10 comprises any embodiment of a work support 10 described with reference to FIG. 1. This method (and any other method described herein) is equally applicable to any other embodiment of work support 10, such as that described with reference to FIG. 2. One preferred embodiment for a method of using a work support 10 comprises the steps of:

(1) introducing fluid back pressure against a barrier 23 from a general longitudinal direction external to the second end of the body 20;

(2) placing a work piece load 34 on the pin 32 thereby placing roller bearings 62 in a locking relationship with the pin ramp 48 and the inner wall of the body 16; and (3) removing both the work piece load 34 and the fluid back pressure in order to unlock the roller bearings 62 from the pin ramp 48 and the inner wall of the body 16.

This method incorporates the advantageous step of requiring removal of both the work piece load 34 and the fluid back pressure in order to unlock the work support pin 32.

In another preferred embodiment for a method of using the work support 10 as such work support 10 is described with reference to FIG. 1 or FIG. 2, said method comprises the steps of:

(1) introducing fluid back pressure against a barrier 23 from a general direction of the second end of the body 20;

(2) placing a work piece load 34 on the pin 32, thereby placing the roller bearings 62 in a locking relationship with the pin ramp 48 and the inner wall of the body 16; and (3) continuing the locking relationship of the roller bearings 62, pin ramp 48 and inner wall of the body 16 on either of the removal of the work piece load 34 or the termination of fluid back pressure until work piece load 34 removal and fluid back pressure termination have both occurred.

In this method the work piece load 34 may be removed, or the fluid back pressure may be terminated, but the locking relationship continues until both events have occurred. There is increased flexibility of operating where the work piece load 34 may be moved or removed, or the fluid back pressure may be interrupted for short periods, without loss of the locked condition. In addition, an operator is protected from injury to a greater extent than with other work supports due to reduced possibility of locking failure upon the occurrence of any one but not both of these events.

In either of the method embodiments described above, the work support 10 may be utilized with the introduction of fluid back pressure that need not exceed about 40 to 80 psi. In addition, it is believed that each of the methods may be utilized wherein the work piece load 34 may be within a range of from about 1 to at least 6000 psi. Toward the higher end of such range, it is preferable to scale up the physical size of all work support 10 components compared to sizes used at lower pressures.

In the above methods, and throughout this document, "termination" of fluid back pressure does not necessarily mean that the pressure must be reduced to zero. To the contrary, termination of fluid back pressure in these methods, and throughout this document, comprises a reduction in pressure to about 0 to 39 psi, assuming any opposing spring pressure exceeded that level.

The present invention further may comprise an improved locking mechanism 11, which may be used as a portion of a work support 10, or any other device which uses a locking mechanism 11, to selectively lock and unlock a movable pin 32 to control its movement in a longitudinal direction as fluid back pressure and a work piece load 34 are selectively applied and removed. In one preferred embodiment, this improved locking mechanism 11 comprises:

a pin 32 with a first portion 36, a second portion 38 and a pin ramp 48 interposed between said first and second portions 36, 38;

a body 12 containing a first end and a second end of the body 18, 20 respectively, and containing a body bore 14 defined by an inner wall of the body 16, within which bore 14 the pin 32 is slidably positioned and may move in a longitudinal direction along the longitudinal axis of the body 28;

a plurality of roller bearings 62 movably positioned in the body bore 14 in proximity to the pin ramp 48; and a barrier 23 enclosing the second end of the body 20 and directly or indirectly communicating with the roller bearings; and means for selectively causing locking and unlocking of the roller bearings 62 with the inner wall of the body 12 and the pin ramp 48.

In this context, the means for selectively causing locking and unlocking of the pin ramp 48, inner wall of the body 12, and the roller bearings 62 may comprise any of the following: (1) a plate or similar device (such as a shim plate 64) to provide a relatively flat surface to retain the bearings 62 in desired position, and wherein fluid back pressure may be introduced against barrier 23 which communicates directly or indirectly with such plate or device to urge the roller bearings 62 against the inner wall of the body 16 and the pin ramp 48, until it is desired to unlock the mechanism and fluid back pressure and work piece load are then removed; (2) the embodiment described in (1), further comprising a cage assembly 68 which forms barrier 23 toward the second end of the body 20, which cage assembly 68 engages the roller bearings 62.

In an alternative preferred embodiment, locking mechanism 11 may be made and used as described above, wherein:

the pin 32 forms a portion of a pin assembly 30 communicating with the body bore 14;

the bearings 62 form a portion of a bearing assembly 60 communicating with the body bore 14 toward the second end of the body 20, which bearing assembly 60 comprises a cage assembly 68 containing the barrier 23 and the plate 64; and further comprising a cage seal 80 communicating with the second end of the body 20 and the cage assembly 68, and a lip seal 84 communicating with the pin assembly 30 and the first end of the body 18.

Any other work support 10 components, as may be described with reference to any embodiment of work support 10, may also selectively be included as part of the locking means.

This improved locking mechanism 11 offers all the advantages described with reference to the locking mechanism 11 of work support 10. In addition, any method of using a work support 10 described herein, is equally applicable to be adapted and used as a method for using a locking mechanism 11.

Although only a few embodiment have been described in detail above, those having ordinary skill in the art will certainly understand that many modifications are possible in the preferred embodiment without departing from the teachings thereof. All such modifications are intended to be encompassed within the following claims.

I claim:

1. A work support, comprising:
   a body having a first end, a second end, and an inner wall, said inner wall defining a body bore having a diameter, which body bore extends from the first end toward the second end;
   a nose cap attached to and partially closing the first end, said nose cap forming a nose cap opening having a diameter smaller than the body bore diameter, wherein the nose cap opening and the body bore are each formed about a longitudinal axis of the body;
   a pin assembly, comprising:
      a cylindrical pin for receiving a work piece load, slidably fitting into the body bore, having a first portion with a first portion diameter approximating the nose cap opening diameter, a second portion with a second portion diameter less than the first portion diameter, and a middle portion defining a pin ramp connecting the first and second portions, the pin ramp having a terminal end formed toward the first portion, the terminal end having a diameter larger than the nose cap opening;
      a pin return device, positioned between the second portion of the pin and the second end of the body, for proper longitudinal pin positioning upon resetting of the pin; and
      a reset system, positioned between the nose cap and a cage cap, to reset a bearing assembly; and
   a bearing assembly positioned in the body bore, comprising:
      a plurality of roller bearings circumferentially spaced about a cross sectional plane of the body bore, so as to contact the pin ramp and the inner wall of the body, upon rotation of the bearings toward the first end of the body;
      a shim plate positioned between the bearings and the second end of the body;
      a ball retention spring positioned between the shim plate and the second end of the body, to maintain a positive contact between the shim plate and the bearings; and
      a cage assembly for retaining bearings in position for longitudinal movement, comprising:
         a cage engaging the bearings from the second end of the body, which cage includes a barrier that encloses the second end of the body; and
         a cage cap attached to the cage between the bearings and the first end of the body so as to capture the bearings between said cage cap and said shim plate.

2. A work support as recited in claim 1, wherein the pin return device comprises a material having elastic memory.

3. A work support as recited in claim 1, wherein the reset system comprises the forming of a port through the body for the introduction of pressurized fluid to reset the bearing assembly.

4. A work support as recited in claim 1, wherein the pin return device comprises a pin return spring.

5. A work support as recited in claim 4, wherein the reset system comprises a reset spring.

6. A work support as recited in claim 5, further comprising a cage seal communicating with the cage and the body.

7. A work support as recited in claim 6, further comprising a lip seal communicating with the nose cap and the pin.

8. A work support as recited in claim 7, wherein the cage seal comprises an o-ring seal.

9. A work support as recited in claim 8, wherein the lip seal comprises an o-ring seal.

10. A work support as recited in claim 9, wherein the pin contains a pin cavity formed in the second portion, the second end of the body forms a cylindrical extension which extends into the body bore, and the pin cavity and cylindrical extension each retain one end of the pin return device in desired radial position about the longitudinal body axis.

11. A work support as recited in claim 10, wherein the roller bearings comprise spherical roller bearings, and the bearing assembly comprises at least four such bearings.

12. A work support as recited in claim 11, wherein the roller bearings comprise steel roller bearings with a hardness of at least about 60 on a Rockwell scale.

13. A work support as recited in claim 11, wherein the roller bearings comprise stainless steel roller bearings with a hardness of at least about 60 on a Rockwell scale.

14. A work support as recited in claim 12, further comprising a plurality of nose cap retaining screws attaching the nose cap to the first end of the body through a plurality of aligned, tapped apertures formed through the nose cap and continuing into the first end of the body.

15. A work support as recited in claim 14, wherein the body comprises an externally threaded body, the work support further comprising:
   a cylindrical base with a first end and a second end;
   an internally threaded bore defined in the base first end for receiving the threaded body; and
   at least one direct port defined in the base second end for the introduction of fluid back pressure.

16. A work support as recited in claim 15, wherein the first portion of the pin contains a tapped aperture formed about the pin's longitudinal axis.

17. A work support as recited in claim 16, wherein the bearings, pin and body are made of materials with approximately equal Rockwell hardness.

18. A work support as recited in claim 10, wherein the roller bearings comprise cylindrical roller bearings, and the pin ramp and the inner wall of the body each define a plurality of corresponding pin ramp channels and body channels capable of receiving the cylindrical roller bearings as the bearing assembly moves longitudinally toward the first end of the body.

19. A work support as recited in claim 18, wherein the bearing assembly comprises at least four cylindrical roller bearings.

20. A work support as recited in claim 19, wherein the roller bearings comprise steel roller bearings with a hardness of at least about 60 on a Rockwell scale.

21. A work support as recited in claim 19, wherein the roller bearings comprise stainless steel roller bearings with a hardness of at least about 60 on a Rockwell scale.

22. A work support as recited in claim 20, further comprising a plurality of nose cap retaining screws attaching the nose cap to the first end of the body through a plurality of aligned, tapped apertures formed through the nose cap and continuing into the first end of the body.

23. A work support as recited in claim 22, wherein the body comprises an externally threaded body, the work support further comprising:

a cylindrical base with a first end and a second end;

an internally threaded bore defined in the base first end for receiving the threaded body; and at least one direct port defined in the base second end for the introduction of fluid back pressure.

24. A work support as recited in claim 23, wherein the first portion of the pin contains a tapped aperture formed about the pin's longitudinal axis.

25. A work support as recited in claim 24, wherein the bearings, pin and body are made of materials with approximately equal Rockwell hardness.

26. A work support, comprising:

a base with a first end and a second end;

an internally threaded bore formed in the base first end;

at least one direct port formed in the base second end for the introduction of fluid back pressure;

an externally threaded body which is threaded into the internally threaded bore, said body having a first end, a second end, and an inner wall, said inner wall defining a body bore having a diameter, which body bore extends from the first end toward the second end;

a nose cap attached to and partially closing the first end of the body, said nose cap forming a nose cap opening having a diameter smaller than the body bore diameter, wherein the nose cap opening and the body bore are each formed about a longitudinal axis of the body;

a pin assembly, comprising:

a cylindrical pin for receiving a work piece load, slidably fitting into the body bore, having a first portion with a first portion diameter approximating the nose cap opening diameter, a second portion with a second portion diameter less than the first portion diameter, and a middle portion defining a pin ramp connecting the first and second portions, the pin ramp having a terminal end formed toward the first portion, the terminal end having a diameter larger than the nose cap opening;

a pin return device, positioned between the second portion of the pin and the second end of the body, for proper longitudinal pin positioning upon resetting of the pin; and a reset system, positioned between the nose cap and a cage cap, to reset a bearing assembly upon removal of a work piece load on the pin and release of fluid back pressure; and a bearing assembly positioned in the body bore, comprising:

a plurality of roller bearings circumferentially spaced about a cross sectional plane of the body bore, so as to contact the pin ramp and the inner wall of the body, upon rotation of the bearings toward the first end of the body;

a shim plate positioned between the bearings and the second end of the body;

a ball retention spring positioned between the shim plate and the second end of the body, to maintain a positive contact between the shim plate and the bearings; and a cage assembly for retaining bearings in position for longitudinal movement, comprising:

a cage engaging the bearings from the second end of the body, which cage includes a barrier that encloses the second end of the body; and a cage cap attached to the cage between the bearings and the first end of the body so as to capture the bearings between said cage cap and said shim plate.

27. An improved locking mechanism, comprising:

a pin with a first portion, a second portion, and a pin ramp interposed between said first and second portions;

a body comprising a first end and a second end, wherein the body contains a body bore defined by an inner wall of the body, and the pin is slidably positioned within the body bore along a longitudinal axis of the body;

a plurality of roller bearings movably positioned in the body bore in proximity to the pin ramp;

a barrier enclosing the second end of the body, and communicating with the roller bearings; and means for selectively causing locking and unlocking of the roller bearings with the inner wall of the body and the pin ramp.

28. An improved locking mechanism as recited in claim 27, wherein said selective locking and unlocking means comprises:

a plate communicating directly or indirectly with the barrier and the roller bearings to provide a relatively flat surface to retain the bearings in desired position; and fluid back pressure introduced against the barrier from a general longitudinal direction external to the second end of the body to urge the roller bearings against the inner wall of the body and the pin ramp in a locking relationship upon adding a work piece load to the first portion of the pin, such locking relationship to continue until fluid back pressure is terminated and the work piece load is removed.

29. An improved locking mechanism as recited in claim 28, wherein the pin forms a portion of a pin assembly communicating with the body bore, and wherein the bearings form a portion of a bearing assembly communicating with the body bore toward the second end of the body, which bearing assembly comprises a cage assembly containing the barrier and the plate and wherein the locking mechanism further comprises:

a cage seal communicating with the second end of the body and the cage assembly; and a lip seal communicating with the pin assembly and the first end of the body.

* * * * *